United States Patent
Hanes, Jr. et al.

(10) Patent No.: US 7,216,704 B2
(45) Date of Patent: *May 15, 2007

(54) METHODS AND COMPOSITIONS FOR BREAKING VISCOSIFIED FLUIDS

(75) Inventors: Robert E. Hanes, Jr., Oklahoma City, OK (US); Richard W. Pauls, Duncan, OK (US); David E. Griffin, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 256 days.

This patent is subject to a terminal disclaimer.

(21) Appl. No.: 10/983,937

(22) Filed: Nov. 8, 2004

(65) Prior Publication Data

US 2005/0061502 A1 Mar. 24, 2005

Related U.S. Application Data

(63) Continuation-in-part of application No. 10/447,914, filed on May 29, 2003, now Pat. No. 6,767,857.

(51) Int. Cl.
*E21B 43/04* (2006.01)

(52) U.S. Cl. ............ 166/278; 166/300; 507/209; 507/211; 507/213; 507/215; 507/216; 507/269; 507/273; 507/277; 507/921; 507/922

(58) Field of Classification Search ........ 166/276, 166/278, 300; 507/209, 211, 213, 215, 269, 507/273, 277, 921, 922
See application file for complete search history.

(56) References Cited

U.S. PATENT DOCUMENTS

| | | | |
|---|---|---|---|
| 3,760,881 A | 9/1973 | Kiel | 166/308 |
| 4,144,179 A | 3/1979 | Chatterji | 252/8.55 |
| 4,506,734 A | 3/1985 | Nolte | 166/308 |
| 4,552,674 A | 11/1985 | Brown et al. | 252/8.55 |
| 4,567,947 A | 2/1986 | Mzik | 166/308 |
| 5,054,552 A | 10/1991 | Hall et al. | 166/278 |
| 5,067,566 A | 11/1991 | Dawson | 166/308 |
| 5,295,542 A | 3/1994 | Cole et al. | 166/278 |
| 5,624,886 A | 4/1997 | Dawson et al. | 507/217 |
| 5,846,915 A | 12/1998 | Smith et al. | 507/269 |
| 5,877,127 A * | 3/1999 | Card et al. | 507/273 |
| 6,123,965 A | 9/2000 | Jacob et al. | 424/489 |
| 6,719,051 B2 | 4/2004 | Hailey, Jr. et al. | 166/278 |
| 6,767,868 B2 | 7/2004 | Dawson et al. | 507/236 |
| 6,924,254 B2 * | 8/2005 | Todd | 507/268 |
| 6,976,538 B2 * | 12/2005 | Wilson et al. | 166/300 |
| 6,987,083 B2 * | 1/2006 | Phillippi et al. | 507/213 |
| 2004/0242430 A1 * | 12/2004 | Griffin et al. | 507/100 |

FOREIGN PATENT DOCUMENTS

EP 1 267 034 A2 12/2002

* cited by examiner

*Primary Examiner*—George Suchfield
(74) *Attorney, Agent, or Firm*—Robert A. Kent; Baker Botts

(57) ABSTRACT

Improved methods for treating and for fracturing subterranean formations and the fluid compositions are provided. A method presented herein is a method of reducing the viscosity of a viscosified treatment fluid that comprises providing a viscosified treatment fluid that comprises a basic fluid and a gelling agent, providing a breaker composition comprising an oxidizing breaker and a breaker activator that comprises a reducing sugar; and allowing the breaker composition and the viscosified treatment fluid to interact so as to reduce the viscosity of the viscosified treatment fluid.

26 Claims, No Drawings

METHODS AND COMPOSITIONS FOR BREAKING VISCOSIFIED FLUIDS

CROSS-REFERENCE TO RELATED APPLICATION

This application is a Continuation-in-part application of commonly owned U.S. application Ser. No. 10/447,914 entitled "Methods and Compositions for Breaking Viscosified Fluids," filed on May 29, 2003, now U.S. Pat. No. 6,767,857 which is hereby incorporated by reference herein for all purposes.

BACKGROUND OF THE INVENTION

This invention relates to methods and compositions for treating subterranean formations, and more specifically, to methods and compositions for breaking viscosified fluids utilized in the treatment of subterranean formations.

It is common practice to treat subterranean formations to increase the permeability or conductivity of such formations by procedures that are identified generally as fracturing processes. For example, it is a conventional practice to hydraulically fracture a well in order to create or enhance one or more cracks or "fractures" in the surrounding formation by mechanical breakdown of the formation. Fracturing may be carried out in wells that are completed in subterranean formations for virtually any purpose. The usual candidates for fracturing, or other stimulation procedures, are production wells completed in oil and/or gas containing formations. However, disposal wells and injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. Usually a gel, an emulsion or a foam having proppant particulates, such as sand or other particulate material, suspended therein is introduced into the fractures. The proppant particulates are deposited in the fractures and aid in maintaining the integrity of the fractures after the pressure is released and the fracturing fluid flows back into the well. The fracturing fluid usually has a sufficiently high viscosity to retain the proppant particulates in suspension or at least to reduce the tendency of the proppant particulates to settle out of the fracturing fluid as the fracturing fluid flows along the created fracture. Generally, a viscosifier such as a polysaccharide gelling agent is used to gel the fracturing fluid to provide the high viscosity needed to realize the maximum benefits from the fracturing process.

After the high viscosity fracturing fluid has been pumped into the formation and fracturing of the formation has occurred, it is desirable to remove the fluid from the formation to allow hydrocarbon production. Generally, the removal of the highly viscous fracturing fluid is realized by "breaking" the gel (i.e., reducing the viscosity of the fracturing fluid). Breaking the gelled fracturing fluid has commonly been accomplished by contacting the fracturing fluid with a suitable "breaker," e.g., a viscosity-reducing agent.

Oxidizing breakers such as peroxides, persulfates, perborates, oxyacids of halogens and oxyanions of halogens, are used to break aqueous based fracturing or treating fluids at temperatures above 250° F. by oxidative depolymerization of the polymer backbone. However, in some temperature regimes these oxidizing agents can be generally ineffective for breaking the viscosity within a reasonable time period. For example, when using a chlorous acid oxidizing breaker below about 250° F., an activator is required to break the polymer in a timely fashion. Cupric ion chelated with ethylenediaminetetraacetic acid (EDTA) can provide the necessary activation; however, future use of transition metal ions, especially in oceanic drilling sites, may become less environmentally acceptable.

SUMMARY OF THE INVENTION

This invention relates to methods and compositions for treating subterranean formations, and more specifically, to methods and compositions for breaking viscosified fluids utilized in the treatment of subterranean formations.

In one embodiment, the present invention provides a method of providing sand control to at least a portion of a subterranean formation comprising: providing a gravel pack treatment fluid composition comprising a base fluid, a gelling agent, and gravel particulates; providing a breaker composition that comprises an oxidizing breaker and a breaker activator that comprises a reducing sugar; introducing the gravel pack treatment fluid composition to a well bore penetrating a subterranean formation so that the gravel particulates form a gravel pack in or near a portion of the well bore; and allowing the viscosity of the gravel pack treatment fluid composition to be reduced.

In another embodiment, the present invention provides a method of reducing the viscosity of a viscosified treatment fluid comprising: providing a viscosified treatment fluid that comprises a base fluid and a gelling agent, providing a breaker composition comprising an oxidizing breaker and a breaker activator that comprises a reducing sugar; and allowing the breaker composition and the viscosified treatment fluid to interact so as to reduce the viscosity of the viscosified treatment fluid.

In another embodiment, the present invention provides a method of fracturing a portion of a subterranean formation comprising: providing a viscosified treatment fluid that comprises a base fluid and a gelling agent; providing a breaker composition comprising an oxidizing breaker and a breaker activator that comprises a reducing sugar; contacting the portion of the subterranean formation with the viscosified treatment fluid under conditions effective to create or enhance at least one fracture therein; and allowing the breaker composition and the viscosified treatment fluid to interact so as to reduce the viscosity of the viscosified treatment fluid.

In another embodiment, the present invention provides a breaker composition that comprises an oxidizing breaker and a breaker activator that comprises a reducing sugar.

The objects, features and advantages of the present invention will be readily apparent to those skilled in the art upon a reading of the description of preferred embodiments which follows.

DESCRIPTION OF PREFERRED EMBODIMENTS

This invention relates to methods and compositions for treating subterranean formations, and more specifically, to methods and compositions for breaking viscosified fluids utilized in the treatment of subterranean formations.

In certain embodiments, the methods of this invention comprise the following steps. A treatment fluid composition is provided that comprises a gelling agent and a base fluid, a breaker composition is provided that comprises an oxidizing breaker and a breaker activator that comprises a reducing sugar. The treatment fluid is placed into a well bore, and a portion of the subterranean formation is treated. The term "treatment fluid" as used herein generally refers to a fluid and does not imply any particular action or treatment by the fluid.

The treatment fluids suitable for use in conjunction with the compositions and methods of this invention comprise a gelling agent and a base fluid. Typical gelling agents that may be included in the treatment fluids that may be used in connection with the present invention typically comprise biopolymers, synthetic polymers, or a combination thereof. The gelling agents may serve to increase the viscosity of the treatment fluid. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. The gelling agents may be biopolymers comprising natural, modified and derivatized polysaccharides, and derivatives thereof that contain one or more of these monosaccharide units: galactose, mannose, glucoside, glucose, xylose, arabinose, fructose, glucuronic acid, or pyranosyl sulfate. Suitable gelling agents include, but are not limited to, guar, hydroxypropyl guar, carboxymethyl guar, carboxymethylhydroxypropyl guar, other derivatives of guar gum, xanthan, galactomannan gums, cellulose, hydroxyethylcellulose, carboxymethylcellulose, and other cellulose derivatives, derivatives thereof, and combinations thereof. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. A particularly suitable succinoglucan biopolymer gelling agent is commercially available under the tradename "FLO-PAC™" from Halliburton Energy Services of Duncan, Okla. Generally speaking, the amount of a gelling agent that may be included in a treatment fluid for use in conjunction with the present invention depends on the viscosity desired. Thus, the amount to include will be an amount effective to achieve a desired viscosity effect. In certain exemplary embodiments of the present invention, the gelling agent may be present in the treatment fluid in an amount in the range of from about 0.1% to about 10% by weight of the treatment fluid. In other exemplary embodiments, the gelling agent may be present in the range of from about 0.1% to about 2% by weight of the treatment fluid. One skilled in the art, with the benefit of this disclosure, will recognize the appropriate gelling agent and amount of the gelling agent to use for a particular application.

The base fluid of the viscosified treatment fluids that may be used in conjunction with the compositions and methods of this invention may comprise an aqueous-based fluid, an oil-based fluid, or an emulsion. The base fluid may be from any source provided that it does not contain compounds that may adversely affect other components in the treatment fluid. The base fluid may comprise a fluid from a natural or synthetic source. In certain exemplary embodiments of the present invention, an aqueous-based base fluid may comprise fresh water or salt water depending upon the particular density of the composition required. The term "salt water" as used herein may include unsaturated salt water or saturated salt water. Generally speaking, the base fluid will be present in the treatment fluid in an amount in the range of from about 80% to about 99.5% by weight. In other exemplary embodiments, the base fluid will be present in the treatment fluid in an amount in the range of from about 90% to about 99% by weight. Depending upon the desired viscosity of the viscosified treatment fluid, more or less of the base fluid may be included. One of ordinary skill in the art, with the benefit of this disclosure, will recognize an appropriate base fluid and the appropriate amount of base fluid to use for a chosen application.

The breaker compositions of the present invention generally comprise an oxidizing breaker and a breaker activator that comprises a reducing sugar. The breaker compositions act to at least partially reduce the viscosity of a treatment fluid. Suitable examples of oxidizing breakers that may be used in the breaker compositions of the present invention include, but are not limited to, peroxides, persulfates, perborates, oxyacids and oxyanions of halogens, derivatives thereof, and combinations thereof. Oxyacids and oxyanions of chlorine, for example, are hypochlorous acid and hypochlorites, chlorous acid and chlorites, chloric acid and chlorates, and perchloric acid and perchlorate. In certain exemplary embodiments, the oxidizing breaker may comprise chlorous acid, hypochlorous acid, a derivative thereof, or a combination thereof. Chlorous acid is available commercially under the tradename "VICON™" from Halliburton Energy Services of Duncan, Okla. In other exemplary embodiments, the oxidizing breaker comprises a peroxide. Suitable peroxides are available commercially under the tradename "OXOL™" from Halliburton Energy Services of Duncan, Okla. An example of a persulfate includes sodium persulfate. Other examples of persulfates may include ammonium persulfate and/or potassium persulfate. Sodium persulfate is available commercially under the tradename "SP™" from Halliburton Energy Services of Duncan, Okla. The amount of an oxidizing breaker that may be used in the breaker compositions of the present invention may depend on several factors, including, but not limited to, the injection time desired, the gelling agent and its concentration, the formation temperature and other factors. The oxidizing breaker is preferably present in the treatment fluid in an amount in the range of from about 0.005% to about 0.25% by weight thereof. More preferably, to achieve a break in the fluid viscosity in from about 1 to about 24 hours, the oxidizing breaker concentration should be in the range of from about 0.01% to about 0.2% by weight thereof.

Below about 250° F., oxidizing breakers often require activation to operate in a timely fashion. We have discovered that reducing sugars at least partially activate the oxidizing breaker to enable it, inter alia, to work at such temperature ranges in a timely fashion. The term "reducing sugar(s)" as used herein includes monosaccharide reducing sugars, disaccharide reducing sugars, trisaccharide reducing sugars, tetrasaccharide reducing sugars, pentasaccharide reducing sugars, hexasaccharide reducing sugars, as well as polysaccharides with greater than six repeat units and having reducing sugar end groups. Preferably, the reducing sugar is a monosaccharide, disaccharide or trisaccharide, derivatives thereof, and combinations thereof. Specific examples of suitable reducing sugar breaker activators include, but are not limited to, fructose, galactose, glucose, mannose, allose, altrose, idose, talose, gulose, lactose, sorbose, maltose, palatinose, turanose, maltotriose, derivatives thereof, and combinations thereof. More preferably, the reducing sugar is fructose, galactose, maltose or lactose, and most preferably fructose or galactose. Fructose, for example, is commercially available from Sigma-Aldrich of St. Louis, Mo. The amount of breaker activator that should be included in the breaker composition is that amount required to sufficiently activate the oxidizing breaker for a particular purpose. Factors including the injection time desired, the gelling agent and its concentration, the formation temperature as well as other considerations known to those skilled in the art may guide the decision of the amount to include. The reducing sugar is preferably present in the treatment fluid in an amount in the range of from about 0.1% to about 100% by weight of oxidizing breaker, more preferably in the range of from about 0.5% to about 50%.

The breaker compositions of the present invention may be used in any suitable form. For instance, the breaker composition may be in the form of a liquid, a gel, an emulsion, or a solid. In certain applications, a liquid form may be useful, e.g., when a faster break is desired. In certain embodiments, the breaker compositions of the present invention may be used in a form that allows for a delayed release of the breaker composition into a treatment fluid. A delayed release of the breaker composition may be desirable, for instance, when the subterranean operation will involve a long pump time. To provide a delayed release of the breaker composition, in certain exemplary embodiments, the breaker composition may be encapsulated or enclosed within an outer coating that is capable of degrading at a desired time. A number of encapsulation methods are suitable for at least partially coating the breaker compositions in accordance with the present invention. Generally, the encapsulation methods of the present invention are capable of delaying the release of the breaker composition for at least about 30 minutes, preferably about one hour. Some suitable encapsulation methods comprise known microencapsulation techniques including known fluidized bed processes. One such fluidized bed process is known in the art as the Würster process. A modification of this process uses a top spray method. Equipment to effect such microencapsulation is available from, for example, Glatt Air Techniques, Inc., Ramsey, N.J. Additional methods of coating may be found in U.S. Pat. No. 6,123,965 issued to Jacob, et al. Typically, these encapsulation methods are used to apply a coating of from about 20% by weight to about 30% by weight, but they may be used to apply a coating anywhere ranging from about 1% by weight to about 50% by weight. Generally, the amount of coating depends on the chosen coating material and the purpose of that material.

Other methods of encapsulation may include agglomerating or pelletizing the breaker composition prior to coating the breaker composition with the degradable material. This agglomeration or pelletization allows breaker compositions that may not typically be compatible with traditional encapsulation methods (e.g., breaker compositions in powdered form or those lacking a smooth exterior) to be encapsulated using traditional methods. A number of agglomeration and/or pelletization methods are suitable for use in the present invention. One suitable method involves using a Glatt machine along with a binder. The binder may be water, an oil, a surfactant, a polymer, or any other material that can be sprayed and cause the particles to stick together, either temporarily or permanently. Generally, when a temporary binder (such as water) is used the agglomeration process is followed by a sprayed-on coating process to coat the pelletized breaker composition with a degradable material.

Another method of coating the breaker composition within a degradable material is to physically mix the breaker composition with the degradable material and to form a single, solid particle comprising both materials. One way of accomplishing such a task is to take a powder form of a breaker composition of this invention and to mix it with a melted degradable polymer and then to extrude the mixture into the form of pellets. The mixture can be formed by any number of means commonly employed to produce mixtures of thermoplastics and other components, for example by using a single screw or twin screw extruder, roll mill, Banbury mixer, or the like. The mixture can be made by melting the degradable material and adding the breaker composition as a solid or a liquid, or the components can be added simultaneously. The breaker composition can be present in the particle as either a homogeneous solid state solution or as discrete particles of breaker composition in the degradable particle. The particles may be washed in water or some other solvent in order to remove particles of breaker composition on the surface of the pellet. An example of a commercially available ammonium persulfate delayed release breaker is "OPTIFLO-III™" from Halliburton Energy Services of Duncan, Okla.

The viscosity breaking reaction can be kinetically enhanced, e.g., at temperatures as low as about 140° F., by the addition of conventional activators to a breaker composition of this invention. Such conventional activators include, but are not limited to, cupric ion chelated with ethylenediaminetetraacetic acid (EDTA), aminocarboxylates, diamines, derivatives thereof, combinations thereof, and similar compounds familiar to those skilled in the art. When used, the conventional activator is preferably present in the treatment fluid composition in an amount in the range of from about 0.01% to about 1% by weight thereof, more preferably from about 0.25% to about 0.4%. The viscosity breaking reaction can also be kinetically enhanced by addition of iron salts, preferably iron (II), iron (III) chloride, derivatives thereof, and combinations thereof, to the reducing sugar breaker activator and oxidizing breaker. The iron salts have been discovered to catalyze the viscosity breaking reaction. The iron salt catalysts are effective at temperatures as low as about 100° F. and may be added in combination with conventional activators or alone. When used, the iron salt catalyst is preferably present in the treatment fluid composition in an amount in the range of from about 0.1 ppm to about 100 ppm.

Optionally, the treatment fluids of the present invention may comprise commonly used additives such as crosslinkers, proppant particulates, and/or gravel particulates. Crosslinkers include chemicals that are capable of crosslinking molecules of the gelling agent, which may result in an increased viscosity of the treatment fluid. Examples of suitable cross-linking chemicals include borates, zirconium, titanium, aluminum, calcium, magnesium, any of the transition metal ions and organic linkers like glutaraldehyde that are capable of crosslinking molecules of the particular gelling agent utilized, and combinations thereof. Proppant particulates, inter alia, fill voids, cavities, crevices, channels behind casing strings, or channels within the subterranean formation. After a fracture has been created or enhanced, the fracture may have the tendency to revert to its original state. By lodging in these fractures, proppant particulates may be able to maintain the integrity of the fractures during production. Suitable proppant particulates include, but are not limited to, ground walnut hulls, polymer particles, microspheres, glass particles, ceramic particles, silica particles, rubber particles, combinations thereof, and the like. Gravel particulates used in accordance with the present invention are generally of a size such that formation particulates that may migrate with produced fluids are prevented from being produced from the subterranean formation. Suitable gravel particulates may include, but are not limited to, graded sand, bauxite, ceramic materials, glass materials, walnut hulls, polymer beads, and the like. Generally, the gravel particulates have a size in the range of from about 4 to about 400 mesh, U.S. Sieve Series.

Optionally, other additives may be included in the treatment fluids if it is desirable to do so. The treatment fluid often includes salts such as alkylammonium chlorides, sodium chloride, and potassium chloride and other agents known to those skilled in the art, to minimize the swelling of clays and chances of damage to the subterranean formation. These may also include, but are not limited to, weighting agents, $H_2O$ soluble salts, wetting agents, fluid loss agents, thinning agents, lubricants, anti-oxidants, pH control agents, bactericides, clay stabilizers, surfactants, corrosion inhibitors, scale inhibitors, and the like that do not adversely react with the other constituents of this invention. One of ordinary skill in the art with the benefit of this disclosure will recognize the appropriate type of additive for a particular application.

Breaker compositions of the present invention may be used in sand control treatments such as gravel packing. A gravel packing operation may involve placing a gravel pack screen in the well bore and packing the surrounding annulus between the screen and the well bore with gravel particulates that have a specific size chosen to prevent the passage of formation sand by using a gravel pack fluid comprising an emulsion composition of the present invention. One skilled in the art, with the benefit of this disclosure, will recognize other suitable uses for these breaker compositions. The breaker compositions of this invention can also be used in fracturing operations.

A preferred method of this invention for treating a subterranean formation comprises the following steps: preparing a treatment fluid composition comprising a gelling agent, an oxidizing breaker, a breaker activator comprising a reducing sugar, and water; and treating a portion of the subterranean formation. A preferred gelling agent is a polysaccharide gelling agent.

A treatment fluid composition of this invention for use in treating subterranean formations penetrated by a well bore comprises a gelling agent, an oxidizing breaker, a breaker activator comprising a reducing sugar, and water.

A method of the present invention is a method of providing sand control to at least a portion of a subterranean formation comprising providing a gravel pack treatment fluid composition comprising a base fluid, a gelling agent, and gravel particulates, providing a breaker composition that comprises an oxidizing breaker and a breaker activator that comprises a reducing sugar, introducing the gravel pack treatment fluid composition to a well bore penetrating a subterranean formation so that the gravel particulates form a gravel pack in or near a portion of the well bore, and allowing the viscosity of the gravel pack treatment fluid composition to be reduced.

A method of the present invention is a method of reducing the viscosity of a viscosified treatment fluid comprising providing a viscosified treatment fluid that comprises a base fluid and a gelling agent, and a breaker composition comprising an oxidizing breaker and a breaker activator that comprises a reducing sugar; and allowing the breaker composition and the viscosified treatment fluid to interact so as to reduce the viscosity of the viscosified treatment fluid.

A method of this invention is a method of fracturing a portion of a subterranean formation comprising providing a viscosified treatment fluid that comprises a basic fluid and a gelling agent, providing a breaker composition comprising an oxidizing breaker and a breaker activator that comprises a reducing sugar; contacting the portion of the subterranean formation with the viscosified treatment fluid under conditions effective to create or enhance at least one fracture therein; and allowing the breaker composition and the viscosified treatment fluid to interact so as to reduce the viscosity of the viscosified treatment fluid.

An exemplary embodiment of the present invention is a breaker composition comprising an oxidizing breaker and a breaker activator that comprises a reducing sugar.

To facilitate a better understanding of the present invention, the following examples of preferred embodiments are given. In no way should the following examples be read to limit or define the scope of the invention.

EXAMPLES

Example 1

For the following Examples, all chemicals mentioned are commercially available from Halliburton Energy Services, Inc. of Duncan, Okla. unless stated otherwise. The following control treatment fluid was prepared by the following method. A linear gelling agent, WG-37™, was prepared by adding 7.2 grams (g) of solid xanthan gel to 875.6 g Duncan, Okla. tap water. To this solution was added 260.9 g sodium nitrate and 0.5 milliliters (mL) Baume HCl. This solution was then was placed in a 120 degrees Fahrenheit (° F.) waterbath for 1 hour (hr). This mixture was stirred to disperse the solid before 6 mL of MO-67™, a caustic-based pH control agent available from Halliburton Energy Services in Duncan, Okla., was added. The mixture was then blended at high speed for two minutes. The viscosity was observed to be 56.2 centipoise (cP) at 99.4° F. on a Nordman Instruments 5004 Series, Model 50 viscometer equipped with a B5X bob (Nordman Instruments, Inc., Houston, Tex.). Breaker tests were conducted at 116° F. on five samples to measure the reduction in viscosity. Table 1 lists the viscosity measurements after elapsed times of 1 hr, 2.75 hr, and 4 hr.

TABLE 1

| Viscosity Reduction of Treatment Fluid using Reducing Sugars | | | | | |
|---|---|---|---|---|---|
| Elapsed | Viscosity (cP) | | | | |
| Time, hr | I | II | III | IV | V |
| 1 | 56.2 | 25 | 17 | 34 | 30.2 |
| 2.75 | 48 | 7 | 6.3 | 5.4 | 3 |
| 4 | 48 | 6 | 5.1 | 2.4 | 2.8 |

Each of the reported samples in Table 1 contained the following formulation. Sample I contained the control treatment fluid with no breaker. Sample II contained the control treatment fluid, 0.6 gram/liter (g/L) galactose and 1.2 g/L SP™ breaker. Sample III contained the control treatment fluid, 0.6 g/L galactose, 1.2 g/L SP™ breaker, and 6 mL/L Fe Polyaspartic Acid (PASP). Sample IV contained the control treatment fluid and 1.2 g/L SP™. Sample V contained the control treatment fluid and 6 mL/L Fe(PASP) and 1.2 g/L SP™.

Example 2

The following set of experiments illustrates the utility of reducing sugars as breaker activators for a guar based fluid at 190° F. using a chlorous acid breaker. Table 2 below lists the viscosity measurements for a viscous guar based fluid alone, with chlorous acid, and with chlorous acid activated by each of the reducing sugars galactose, lactose, and fructose. Chlorous acid was added at a dosage of 5 gal/1000 gal of guar-viscosified treating solution and the viscosity was measured over time. The chlorous acid used was VICON™ from Halliburton Energy Services, Inc. of Duncan, Okla. The viscosity values for each sample are reported in Table 2 and the sample compositions are summarized below the table. As can be seen, the chlorous acid is effectively activated by each of the reducing sugars.

TABLE 2

Reducing Sugar Activation of VICON ™ as Measured by Viscosity (cP) of a Guar Based Treatment Fluid at 190° F.

| Elapsed Time, min. | Temp ° F. | SAMPLE I | II | III | IV | V |
|---|---|---|---|---|---|---|
| 0 | 81 | 13 | 15 | 18 | 23 | 20 |
| 30 | 190 | 479 | 433 | 441 | 339 | 283 |
| 60 | 190 | 368 | 277 | 216 | 168 | 101 |
| 90 | 190 | 301 | 208 | 91 | 74 | <26 |
| 120 | 190 | 278 | 145 | 16 | 9 | |
| 150 | 190 | 252 | 100 | 3 | | |
| 180 | 190 | 238 | 48 | | | |

Each of the reported samples in Table 2 contained the following formulation. Sample I contained the control treatment fluid with no breaker or activator. Sample II contained the control treatment fluid and 5.0 gal VICON™ per 1000 gal treatment fluid. Sample III contained the control treatment fluid, 5.0 gal VICON™ per 1000 gal treatment fluid, and 2.0 pounds (lb) galactose per 1000 gal treatment fluid. Sample IV contained the control treatment fluid, 5.0 gal VICON™ per 1000 gal treatment fluid, and 1.0 lb lactose per 1000 gal treatment fluid. Sample V contained the control treatment fluid, 5.0 gal VICON™ per 1000 gal treatment fluid, and 2.0 fructose per 1000 gal treatment fluid.

The control treatment fluid used in Table 2 also contained the following chemicals commercially available from Halliburton Energy Services, Inc. of Duncan, Okla.: 25 lb/1000 gal guar gum as WG-19™; 2.5 gal/1000 gal boric acid as BC-140™; 0.1 gal/1000 gal acetic acid as BA-20™; and 2.0 gal/1000 gal alkoxylated nonyl phenol as LOSURF-300™. Viscosity measurements were made at 190° F. and 95 rpm ($81^{-sec}$ shear rate) on a Nordman Instrument 5004 Series, Model 50 viscometer equipped with a B5X bob (Nordman Instruments, Inc., Houston, Tex.).

Example 3

A second set of experiments, similar to those described in Example 2, were run at 106° F. At this temperature, chlorous acid requires activation to operate in a timely manner. The viscosity measurements are reported in Table 3 and the sample compositions are summarized below the table. The viscosity values displayed in Table 3 illustrate the ability of the reducing sugars to activate the chlorous acid breaker, even at this low temperature.

TABLE 3

Reducing Sugar Activation of VICON ™ as Measured by Viscosity (cP) of a Guar Based Treatment Fluid at 160° F.

| Elapsed Time, min. | Temp ° F. | SAMPLE I | II | III | IV | V | VI |
|---|---|---|---|---|---|---|---|
| 0 | 78 | 329 | 1059 | 916 | 869 | 1096 | 1286 |
| 30 | 161 | 591 | 420 | 343 | 271 | 235 | 260 |

TABLE 3-continued

Reducing Sugar Activation of VICON ™ as Measured by Viscosity (cP) of a Guar Based Treatment Fluid at 160° F.

| Elapsed Time, min. | Temp ° F. | SAMPLE I | II | III | IV | V | VI |
|---|---|---|---|---|---|---|---|
| 11460 | 161 | 454 | 393 | 289 | 122 | 99 | 114 |
| 90 | 161 | 429 | 347 | 203 | 78 | 71 | 61 |
| 120 | 161 | 419 | 303 | 172 | 57 | 47 | 39 |
| 150 | 161 | 404 | 235 | 144 | 41 | 32 | 28 |
| 180 | 161 | 347 | 203 | 119 | 28 | 22 | 17 |

Each of the reported samples in Table 3 contained the following formulation. Sample I contained the control treatment fluid with no breaker or activator. Sample II contained the control treatment fluid and 5.0 gal VICON™ per 1000 gal treatment fluid. Sample III contained the control treatment fluid, 5.0 gal VICON™ per 1000 gal treatment fluid, and 2.0 lb galactose per 1000 gal treatment fluid. Sample IV contained the control treatment fluid, 5.0 gal VICON™ per 1000 gal treatment fluid, and 2.0 lb galactose per 1000 gal treatment fluid. Sample V contained the control treatment fluid, 5.0 gal VICON™ per 1000 gal treatment fluid, and 2.0 fructose per 1000 gal treatment fluid. Sample VI contained the control treatment fluid, 5.0 gal VICON™ per 1000 gal treatment fluid, 2.0 lb fructose, and 0.1 gal 10% CAT-4™, a diethylene triamine activator available from Halliburton Energy Services in Duncan, Okla., per 1000 gal treatment fluid.

The control treatment fluid used in Table 3 also contained the following chemicals: 25 lb/1000 gal guar gum as WG-19™; 2.5 gal/1000 gal boric acid as BC-140™; 0.1 gal/1000 gal acetic acid as BA-20™; and 2.0 gal/1000 gal alkoxylated nonyl phenol as LOSURF-300™. Sample VI included diethylene triamine as a conventional catalyst demonstrating compatibility with the sugar. Viscosity measurements were made at 190° F. and 95 rpm ($81^{-sec}$ shear rate) on a Nordman Instruments 5004 Series, Model 50 viscometer equipped with a B5X bob (Nordman Instruments, Inc., Houston, Tex.).

Example 4

The following experiment illustrates the utility of the reducing sugar galactose along with ferrous chloride catalyst as a breaker activator for a guar based fluid at about 140° F. Chlorous acid was added at a dosage of 5 gal/1000 gal of guar-viscosified treating solution and the viscosity was measured over time. The chlorous acid used was VICON™. The viscosity values for each sample are reported in Table 4 and the sample compositions are summarized below the table. Sample I in Table 4 shows that at a temperature of about 140° F., the chlorous acid by itself is not an effective breaker. Similarly, the combinations chlorous acid with iron (II) chloride, iron (II) chloride with galactose, and chlorous acid with galactose produce little break in viscosity. However, as clearly demonstrated by Samples V-VII, iron chloride catalyzes the reaction of chlorous acid and reducing sugar to rapidly break the viscosified fluid.

TABLE 4

Iron Catalysis of VICON™ and Reducing Sugar Activator Galactose as Measured by Viscosity (cP) of a Guar Based Treatment Fluid

| Elapsed Time, min. | Temp °F. | SAMPLE I | II | III | IV | V | VI | VII |
|---|---|---|---|---|---|---|---|---|
| 0 | 78 | 1454 | 823 | 1636 | 1032 | 1550 | 656 | 1309 |
| 30 | 141 | 472 | 437 | 467 | 574 | 307 | 251 | 200 |
| 60 | 141 | 511 | 303 | 325 | 554 | 108 | 185 | 11 |
| 90 | 141 | 461 | 272 | 287 | 533 | 50 | 8 | |
| 120 | 141 | 435 | 248 | 259 | 487 | 27 | | |
| 150 | 141 | 398 | 234 | 242 | 438 | | | |
| 180 | 141 | 373 | 203 | 210 | 411 | | | |

Each of the reported samples in Table 4 contained the following formulation. Sample I contained the control treatment fluid and 5.0 gal VICON™ per 1000 gal treatment fluid. Sample II contained the control treatment fluid, 5.0 gal VICON™ per 1000 gal treatment fluid, and 0.08 lb $FeCl_2$ per 1000 gal treatment fluid. Sample III contained the control treatment fluid, 0.32 lb $FeCl_2$, and 2.0 lb galactose per 1000 gal treatment fluid. Sample IV contained the control treatment fluid, 5.0 gal VICON™ per 1000 gal treatment fluid, and 3.0 galactose per 1000 gal treatment fluid. Sample V contained the control treatment fluid, 5.0 gal VICON™ per 1000 gal treatment fluid, 3.0 galactose, and 0.08 lb $FeCl_2$ per 1000 gal treatment fluid. Sample VI contained the control treatment fluid, 5.0 gal VICON™ per 1000 gal treatment fluid, 2.0 galactose, and 0.16 lb $FeCl_2$ per 1000 gal treatment fluid. Sample VII contained the control treatment fluid, 5.0 gal VICON™ per 1000 gal treatment fluid, 2.0 galactose, and 0.32 lb $FeCl_2$ per 1000 gal treatment fluid.

The control treatment fluid used in Table 4 also contained the following chemicals commercially available from Halliburton Energy Services, Inc. of Duncan, Okla.: 25 lb/1000 gal guar gum as WG-19™; 7.0% KCl; 3.0 gal/1000 gal boric acid as BC-140™; 0.05 gal/1000 gal acetic acid as BA-20™; and 2.0 gal/1000 gal alkoxylated nonyl phenol as LOSURF-300™. Viscosity measurements were made at 140° F. and 95 rpm ($81^{-sec}$ shear rate) on a Nordman Instruments 5004 Series, Model 50 viscometer equipped with a B5X bob (Nordman Instruments, Inc., Houston, Tex.).

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method of providing sand control to at least a portion of a subterranean formation comprising:
   providing a gravel pack treatment fluid composition comprising a base fluid, a gelling agent, and gravel particulates;
   providing a breaker composition that comprises an oxidizing breaker and a breaker activator that comprises a reducing sugar;
   introducing the gravel pack treatment fluid composition to a well bore penetrating a subterranean formation so that the gravel particulates form a gravel pack in or near a portion of the well bore; and
   allowing the breaker composition and the viscosified treatment fluid to interact whereby the viscosity of the gravel pack treatment fluid composition is reduced.

2. The method of claim 1 wherein the breaker composition is provided with the gravel pack treatment fluid.

3. The method of claim 1 wherein the base fluid is selected from the group consisting of aqueous-based fluids, emulsions, oil-based fluids, and combinations thereof.

4. The method of claim 1 wherein the gelling agent is selected from the group consisting of biopolymers, synthetic polymers, and combinations thereof.

5. The method of claim 1 wherein the gelling agent comprises a polysaccharide.

6. The method of claim 1 wherein the gelling agent is selected from the group consisting of guar, hydroxypropyl guar, carboxymethyl guar, carboxymethylhydroxypropyl guar, xanthan, galactomannan gum, cellulose, hydroxyethylcellulose, carboxymethylcellulose, derivatives thereof, and combinations thereof.

7. The method of claim 1 wherein the gelling agent is present in the range of from about 0.1% to about 10% by weight of the gravel pack treatment fluid composition.

8. The method of claim 1 wherein the oxidizing breaker is selected from the group consisting of peroxides, persulfates, perborates, oxyacids of halogens, oxyanions of halogens, derivatives thereof, and combinations thereof.

9. The method of claim 1 wherein the oxidizing breaker is selected from the group consisting of chlorous acid, hypochlorous acid, derivatives thereof, and combinations thereof.

10. The method of claim 1 wherein the oxidizing breaker comprises sodium persulfate.

11. The method of claim 1 wherein the reducing sugar is selected from the group consisting of monosaccharides, disaccharides, trisaccharides, derivatives thereof, and combinations thereof.

12. The method of claim 1 wherein the gravel pack treatment fluid composition further comprises a conventional activator that comprises a cupric ion chelated with a compound selected from the group consisting of ethylenediaminetetraacetic acid, aminocarboxylates, diamines, derivatives thereof, and combinations thereof.

13. The method of claim 1 wherein the breaker activator comprises a liquid, a gel, an emulsion, or a solid.

14. The method of claim 1 wherein at least a portion of the breaker composition is encapsulated.

15. The method of claim 1 wherein the breaker composition further comprises an iron salt catalyst.

16. The method of claim 15 wherein the iron salt catalyst is selected from the group consisting of iron(II) chlorides, iron(III) chlorides, derivatives thereof, and combinations thereof.

17. The method of claim 15 wherein the iron salt catalyst is present in the gravel pack treatment fluid composition in an amount in the range of from about 0.1 ppm to about 100 ppm by weight thereof.

18. The method of claim 1 wherein the gravel pack treatment fluid composition further comprises a crosslinker.

19. The method of claim 18 wherein the crosslinker is selected from the group consisting of zirconium compounds, titanium compounds, aluminum compounds, antimony compounds, chromium compounds, iron compounds, copper compounds, zinc compounds, and combinations thereof.

20. The method of claim 18 wherein the crosslinker comprises an organic linker.

21. The method of claim 1 wherein the gravel pack treatment fluid composition further comprises an additive selected from the group consisting of weighting agents, water-soluble salts, wetting agents, fluid loss agents, thinning agents, lubricants, anti-oxidants, pH control agents, bactericides, clay stabilizers, surfactants, corrosion inhibitors, scale inhibitors, and combinations thereof.

22. A method of reducing the viscosity of a viscosified treatment fluid comprising:
providing a viscosified treatment fluid that comprises a base fluid and a gelling agent;
providing a breaker composition comprising an oxidizing breaker and a breaker activator that comprises a reducing sugar;
allowing the breaker activator to interact with the oxidizing breaker so as to activate the oxidizing breaker; and
allowing the oxidizing breaker to at least partially depolymerize the polysaccharide gelling agent so as to reduce the viscosity of the viscosified treatment fluid.

23. The method of claim 22 wherein the reducing sugar is selected from the group consisting of monosaccharides, disaccharides, trisaccharides, derivatives thereof, and combinations thereof.

24. The method of claim 22 wherein the breaker composition further comprises a conventional activator that comprises a cupric ion chelated with a compound selected from the group consisting of ethylenediaminetetraacetic acid, aminocarboxylates, diamines, derivatives thereof, and combinations thereof.

25. The method of claim 22 wherein the breaker composition further comprises an iron salt catalyst.

26. The method of claim 22 wherein the oxidizing breaker is selected from the group consisting of chlorous acid, hypochlorous acid, derivatives thereof, and combinations thereof.

* * * * *